United States Patent [19]

Shirai et al.

[11] Patent Number: 5,385,410
[45] Date of Patent: Jan. 31, 1995

[54] VARIABLE RELUCTANCE INTEGRAL BEARING SENSOR

[75] Inventors: Takeshi Shirai, Pendleton, Ind.; Andrzej M. Pawlak, Troy, Mich.

[73] Assignee: General Motors Corporation, Detroit, Mich.

[21] Appl. No.: 938,083

[22] Filed: Aug. 31, 1992

[51] Int. Cl.⁶ ............................................. F16C 33/00
[52] U.S. Cl. ..................................... 384/446; 324/174
[58] Field of Search ............... 384/448, 446, 484, 477; 324/174, 173

[56] References Cited

U.S. PATENT DOCUMENTS

| | | | |
|---|---|---|---|
| 4,946,295 | 8/1990 | Hajzler | 384/448 |
| 4,946,296 | 8/1990 | Olschewski et al. | 384/448 |
| 4,988,220 | 1/1991 | Christiansen | 384/448 |
| 4,991,301 | 2/1991 | Hore | 33/366 |
| 5,004,358 | 4/1991 | Varvello et al. | 384/446 |
| 5,023,546 | 6/1991 | Pawlak et al. | 324/174 |
| 5,023,547 | 6/1991 | Pawlak et al. | 324/174 |
| 5,053,656 | 10/1991 | Hodge | 310/42 |

OTHER PUBLICATIONS

A. Pawlak, J. Adams, T. Shirai; "Novel Variable Reluctance Sensors"; Feb. 25, 1991; SAE International.

Primary Examiner—Lenard A. Footland
Attorney, Agent, or Firm—Vincent A. Cichosz

[57] ABSTRACT

An integral variable reluctance sensor and bearing grease seal assembly (sensor assembly) has at least one magnet and an annular wire coil secured at the interior of a housing which seals an annular space between a dynamic inner race and a static outer race. The sensor assembly is characterized by a relatively large flux change and resulting large peak to peak periodic output due to exploitation of the outer race and housing as high permeance flux paths in the sensor magnetic circuit and an additive arrangement of plural magnets. Sensor output signal strength is variable in step with the number of magnets and output variations due to air gap variations are minimized by symmetrical distribution of the same. The sensor assembly is further characterized by a single dynamic seal and no moving parts.

5 Claims, 3 Drawing Sheets

VARIABLE RELUCTANCE INTEGRAL BEARING SENSOR

BACKGROUND OF THE INVENTION

This invention relates generally to variable reluctance sensors used to detect the angular velocity and/or acceleration of a rotating member. More specifically, the invention relates to such sensors in applications requiring resolution and signal level adequate to accurately detect relatively low angular velocities such as vehicle anti-lock braking and traction control.

The general manner in which a sensor output signal is developed by a variable reluctance sensor is by varying a magnetic flux through a main flux loop surrounded in part by coil windings, thereby inducing a current in the coil. This is typically accomplished by using a toothed ring proximate as possible with minimal air gap to at least one magnet and coil to provide a varying magnetically permeable path for the flux by presenting alternating teeth and spaces to the magnet as the toothed ring rotates. This varies the flux through the coil resulting in a periodic electrical signal at output leads. It is desirable to maximize the flux coupled through the main flux loop since this effects the amplitude of the output signal. This is generally accomplished by minimizing the air gap and providing high permeability flux paths through as much of the main flux loop as practical.

Variable reluctance sensors described in the prior art are frequently depicted proximate to, and at times integral with, vehicle wheel bearing assemblies. A bearing has a rotatably static race coupled to a vehicle chassis and a rotatably dynamic race coupled to a vehicle wheel to rotate at the wheel's angular velocity. Some prior art devices have mounted to, or integral with, a portion of the rotating race a toothed ring made of a suitable magnetically permeable material. Proximate to the outer periphery of such a ring, and rotatably static, is one or more magnets, possibly a magnetically permeable flux member adjacent thereto and coil of wire with a pair of output leads. Arrangements for the magnet and coil vary from generally probe type having a coil wrapped about a flux member to ring type having an annular magnet and coil configuration.

Probe type sensors are mounted either through the bearing housing or external thereto in order that the magnet or flux member is placed in proximity to the toothed ring. The air gap between the toothed ring and the probe is critical to obtaining maximum sensor output but is a burdensome tolerance to control in a manufacturing environment. Annular type sensors used in conjunction with a toothed ring mounted to, or integral with, a portion of the rotating race are disclosed which mount concentrically on the outer peripheral edge of a bearing grease seal radially aligned with the toothed ring which is proximate to the inner surface of the seal. Such an arrangement has a seal separate from the sensor assembly resulting in proliferation of component parts as well as increased gaps between the sensor assembly and the toothed ring approximating the thickness of the seal therebetween. Further, annular magnets utilized in such sensors tend to be costly because of their configuration and amount of magnetic material.

Another annular type sensor shown in the prior art integrates the sensor and a toothed ring or equivalent within a bearing seal. The integral package has inner and outer annular members, a stationary one of which carries at least the coil, with the remaining components being divided between the two members. The inner annular member couples to the inner race and provides a seal therebetween. The outer annular member couples to the outer race and likewise provides a seal therebetween. Some type of dynamic annular seal(s) between the two rotating annular members is also required in addition to the seals at the two races. Subassembly of the sensor is required and tolerances of the package must simultaneously account for proper fit to the inner race and outer race, between the two annular members at the internal seal(s) and between sensor elements.

SUMMARY OF THE INVENTION

One object of the present invention is to provide a sensor for angular velocity of the rotating race in a wheel bearing assembly which does not require tolerance adjustments to air gaps and is relatively insensitive to air gap variations due to normal production and manufacturing processes.

Another object of the invention is to integrate the sensor within a bearing seal having no moving parts itself, a minimal number of component parts, minimal magnetic material and minimal dynamic sealing surfaces.

Still a further object of the invention is to provide an integral bearing sensor with a strong sensor output signal at low angular velocities and to provide a flexible design with regard to output signal strength requirements.

According to the present invention and a preferred embodiment thereof, there is provided an integral rotation sensor and bearing grease seal including a high permeability housing for static mounting to, and providing a seal with, the outer race. A plurality of permanent magnets are arranged on the inner surface of the housing circumferentially spaced to synchronously align with teeth located on a toothed ring attached to, or integral with, a portion of the inner race. The coil is annular and likewise enclosed by the housing but is not concentric with the magnets; rather, it is adjacent the magnets on their outside edges with respect to the bearing assembly rotational axis. Finally, a flexible seal is statically coupled to an outside lip of the housing to provide a dynamic seal with a sealing surface coupled to the inner race. The integral bearing seal/sensor itself has no moving parts and, when compressively assembled into the annular space defined by the inner race and outer race, purposefully exploits the housing and outer race as flux members.

Other objects and advantages of the invention will be more apparent and better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

Figure 1:
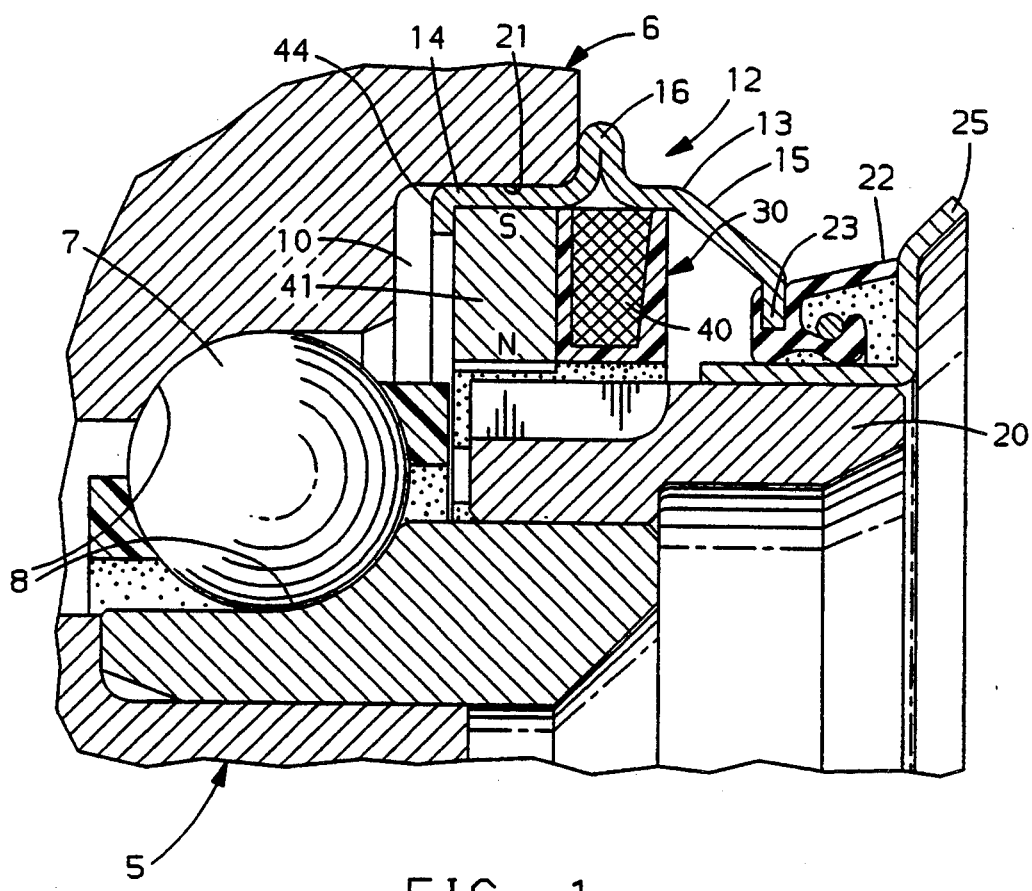
FIG. 1 shows a cross section through a portion of a bearing assembly and a first embodiment of an integral rotation sensor and bearing grease seal according to the invention.

The invention is now described in particularity with respect to the drawings as described above with like numerals referenced in different figures referring to like parts. A bearing assembly is shown having two main portions, designated generally as inner race 5 and outer race 6 and coaxial with each other about a rotational axis. Inner race 5 and outer race 6 are separated radially near one end in a conventional manner by ball bearings 7 disposed therebetween in respective radial race tracks 8, or by other conventional bearing means such as tapered bearings for example. Another set of ball bearings (not shown) or functional equivalent separates inner race 5 and outer race 6 near another end in a similar fashion to ensure coaxial alignment of inner race 5 and outer race 6. Inner race 5 has toothed ring 20 located such that the teeth substantially align radially with inner circumference 21 of outer race 6. Annular space 10 is defined between inner race 5 and outer race 6.

Integral rotation sensor and bearing grease seal, hereafter referred to as sensor assembly 12, is shown in FIG. 1 installed in annular space 10. Housing 13 is rigid and desirably manufactured from a high permeability material for reasons to be expounded upon later in this description. Preferred materials for housing 13 are American Iron and Steel Institute (AISI) 1008 or 1010 sheet metal for reasons of high magnetic permeability and relative ease of forming. Housing 13 has cylindrical section 14 and inwardly tapered section 15 on opposite sides of flange 16. Flange 16, located around the outer periphery of housing 13, is conterminous with one end of outer race 6 to provide an installation travel stop, lends strength to housing 13 and improves sensor performance. Tapered section 15 is so formed for the purpose of providing a reduced inner diameter to axially limit spool assembly 30 to be located radially adjacent the inner surface of cylindrical section 14 of housing 13. A hole (not illustrated) is formed through the wall of tapered section 15 of housing 13 and a grommet (not illustrated) secured therethrough to allow for sealably and protectively passing a pair of wires therethrough. The terminal end (opposite flange 16) of tapered section 15 rolls into an inwardly depending radial lip 23 formed substantially normal to housing 13 axis.

Cylindrical section 14 of housing 13 as shown in FIG. 1 is in compressive communication with inner circumference 21 of outer race 6 at one end of the bearing assembly to establish a grease seal therebetween. Flexible seal 22, which may be of conventional high temperature elastomeric material, is fixed to lip 23 at the terminal end of tapered section 15 of housing 13, the inner surfaces of seal communicating with a smooth corrosion resistant annular surface which is in rotatable communication with inner race 5 to establish a dynamic grease seal therebetween. In the present embodiment, the surface with which seal 22 communicates is illustrated in FIG. 1 as a portion of collar 25. Housing 13 and flexible seal 22 provide protection of bearing assembly from intrusion of foreign material or loss of bearing lubricant through annular space 10. Flexible seal 22 comprises the only dynamic seal of sensor assembly 12.

Figure 2:
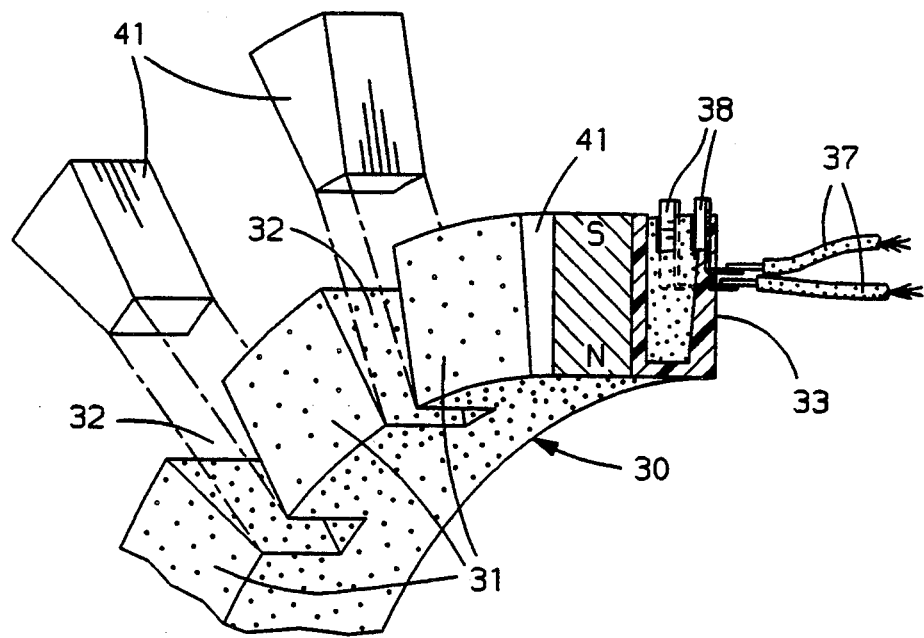
FIG. 2 shows a view of a spool assembly portion of a first embodiment of an integral rotation sensor and bearing grease seal as illustrated in FIG. 1.

A preferred arrangement of sensor components according to the invention is now described relative to the objects heretofore listed. Referring to FIGS. 1 & 2, spool assembly 30 for providing a wrapping surface and containment for coil 40, as well as for spatial containment of magnets 41, is sized on the outside circumference for a slight interference fit within the inner surface of cylindrical section 14 of housing 13, and sized on the inside circumference for a proximate non-contacting fit around toothed ring 20. Spool assembly 30 must be able to withstand high temperatures associated with bearing applications to prevent deformation. One material of conventional usage in such applications due to high temperature stability and moldability is a liquid crystal polymer. Other materials having similar properties include high temperature plastics such as polyphenylene sulfides.

Surface 31, substantially normal to spool assembly 30 axis, has a plurality of pockets 32, each having a pair of opposing walls, for accepting therein radially aligned magnets 41. The walls of each pocket 32 are substantially radial, at least to the degree to which magnets 41 have radial dimensions. This leaves arcuate openings between the walls at the inner and outer circumferences of spool assembly 30 through which radially aligned poles of magnets 41 are exposed. Similar poles of each magnet are exposed at the respective openings located around a common circumference—for example, all north poles will be exposed through the openings located around the inner circumference of spool assembly 30 while all south poles will be exposed through the openings located around the outer circumference of spool assembly 30. Pockets are arcuately separated from each other by a whole number multiple of the arc between two adjacent teeth of rotating toothed ring 20 so that all pockets 32, and therefore magnets 41, align with teeth simultaneously during rotation of toothed ring 20. The most symmetrical distribution of pockets which adheres to the tooth-arc multiple requirement stated is preferable since such distribution has the tendency to reduce signal variations due to concentricity differences, radially untrue toothed ring 20 and/or other rotational aberrations and consequent air gap variations as between magnets 41 and toothed ring 20. A second surface 33 substantially normal to spool assembly 30 axis has disposed therethrough respective internal ends of a pair of adjacent electrical terminals 38 for coupling to the ends of coil 40, the pair of electrical terminals 38 having respective outer ends coupled to respective sensor leads 37. Sensor leads 37 are preferably a stranded copper wire with a high temperature insulation. Insert molding the pair of terminals through spool wall 33 of spool assembly 30 serves to positively locate and retain the terminals and allows for properly orienting the internal ends to be coupled to coil 40 as illustrated in FIG. 2.

A wire having high thermal resistant insulation, such as Essex "SOLIDEX" which has a 180 degrees Celsius thermal classification, is used for coil 40 which is wound in the channel of spool assembly 30 leaving the ends thereof proximate to the inner ends of electrical terminals 38. Coil 40 is retained and prevented from unraveling by an appropriately sized band of temperature resistant elastomer such as DuPont "VITON" which is rated for applications from −40° to 200 degrees Celsius, or by an alternative effective method. Coil 40 is coupled at one end to one of electrical terminals 38 such as by conventional silver/lead solder, and at the other end to the other of electrical terminals 38 in an identical manner. Each of the terminals is formed over to lay perpendicular to coil 40 windings in the channel of spool assembly 30. The terminals are electrically insulated and held in place by a suitable band of temperature resistant elastomer or other means.

Permanent magnets 41 able to withstand high temperatures without significant reduction in magnetic properties are chosen as the flux producing elements. Samarium Cobalt is characterized by high temperature stability and high magnetic energy strength and is the preferred magnet material. A trapezoidal shape is desirable since such a shape will limit radial inward travel when placed convergent end toward axis into a conforming pocket 32 of spool assembly 30. Conventional heat stake or sonic weld operation at the outer circumference of spool assembly 30 is used to secure a trapezoidally shaped magnet in a pocket. Rectangular shaped magnets 41 would require additional similar heat staking or sonic welding at the inner circumference of spool assembly 30.

The outer circumference of spool assembly 30 is mated to the inner surface of cylindrical section 14 of housing 13 with coil 40 end of spool assembly 30 preferably inserted first so as to be closest to tapered section 15 of housing 13. Magnet end of spool assembly 30 may be inserted first; however, this orientation will require obvious modifications to the routing of sensor leads 37 and will result in reduced signal strength during sensor operation. Lead wires 37 sealably pass through the grommet in tapered section 15 of housing 13. To ensure spool assembly 30 retention within housing 13, an inward roll crimping operation may be performed at the terminal end of the cylindrical section 14 of housing 13 around the entire periphery or sections thereof, thereby trapping spool assembly 30 axially between tapered section 15 of housing 13 and crimped end 44 of cylindrical section 14.

Figure 3:
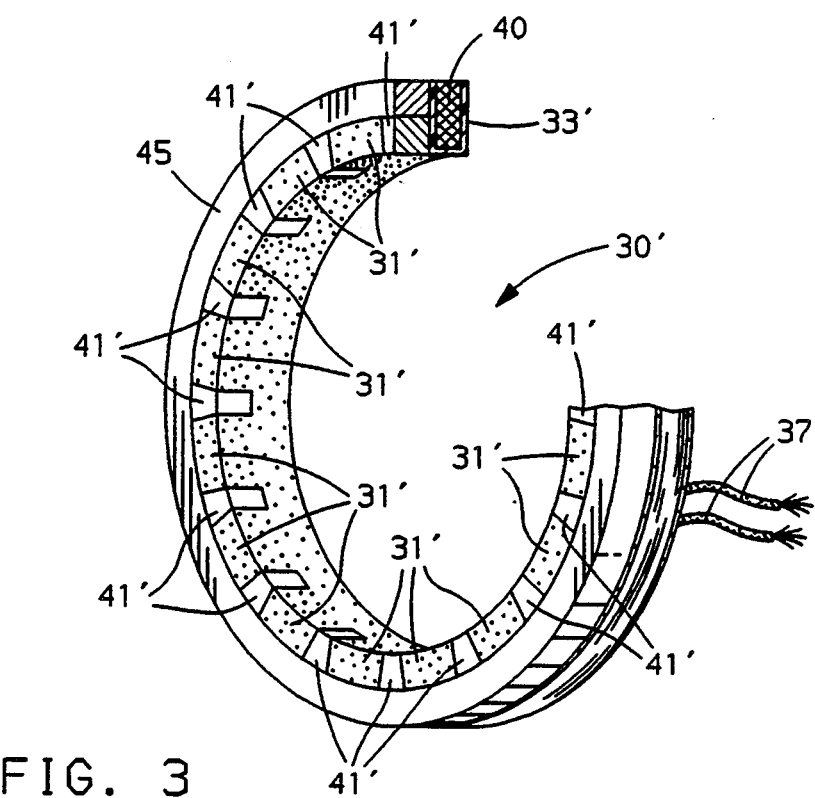
FIG. 3 shows a view of a spool assembly portion of a second embodiment of an integral rotation sensor and bearing grease seal according to the invention.

Referring to FIG. 3, another preferred arrangement of sensor components within the scope of the invention includes, in addition to the previously described components, a ring shaped pole piece 45 machined from a high magnetic permeability stock such as AISI 1214 or 12L14 steel (the L indicating the addition of lead for ease of machinability). Magnetic permeability of these steels may also be enhanced by appropriate annealing. Ring shaped pole piece 45 may also be formed from powdered metal processing and its permeability enhanced by sintering. Although a sintered powdered metal pole piece will not achieve the same level of magnetic permeability as an annealed and machined pole piece, it may offer cost advantages over the same. Pole piece 45 has an outer circumference equal to the outer circumference of spool assembly 30' and may be insert molded during the molding process of spool assembly 30'. Spool wall 33' is substantially identical to spool wall 33 shown in FIG. 2 and would preferably be molded to retain electrical terminals 38, also shown in FIG. 2. The pockets in spool assembly 30' below surface 31' are arranged with circumferential spacing as previously described but differ from pockets 32 shown in FIG. 2 in that they are reduced in size at their outer peripheral edges by the area taken up by pole piece 45. Use of a pole piece allows for reduction in magnetic material required and may therefore be a more cost effective arrangement. In addition, magnets 41' with a smaller dimension along the pole axis may optimize relative signal strength over larger magnets 41 as shown in the arrangement of FIG. 2.

It is noted that the number of magnets is variable according to the requirements of the particular application. Any number of magnets from one up to the number of teeth on toothed ring 20 is employable. The number of magnets used has a proportional impact upon signal strength since each individual magnet induces flux in additive cooperation with all other magnets. Peak to peak output symmetry is also influenced positively with increasing number of magnets since, as described earlier, symmetrical arrangements have an inherent predilection to minimize effects of concentricity imperfections between toothed ring 20 and spool assembly 30.

Figure 4:
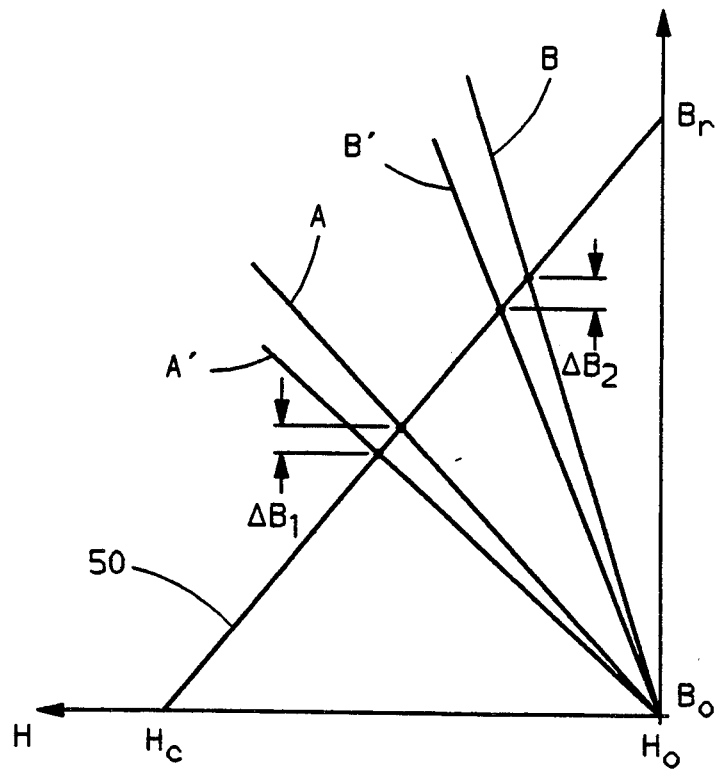
FIG. 4 shows a demagnetization curve for a permanent magnetic material and is illustrative of magnetic circuit behavior according to the invention.

FIG. 4 illustrates well known relationships between magnetic induction (B) along the ordinate and demagnetizing force (H) along the abscissa for the magnetic circuit and is instrumental in appreciating the present invention. Positively sloped demagnetization curve 50 is a section of a complete hysteresis curve for the permanent magnet material and the following discussion applies to operation along the curve bounded by the points labeled $H_c$ and $B_r$. $H_c$ corresponds to the demagnetization force required to null the magnetic induction ($B_0$) in the magnetic material. $B_r$ corresponds to the magnetic induction in the magnetic material when a null demagnetization force ($H_0$) is applied. The magnet is part of a magnetic circuit having a quantifiable opposition to magnetic flux being produced therethrough; this opposition is better known in the art as reluctance, and its reciprocal—the ease with which magnetic flux is produced through the magnetic circuit—is known as permeance. The permeance of the magnetic circuit is represented by a negatively sloped line - the magnetic load line—whose intersection with demagnetization curve 50 establishes an operating point. The slope of the magnetic load line, and therefore the operating point on the curve, is determined by the magnetic circuit configuration which encompasses such factors as magnetic circuit material, air gaps, leakage flux and overall effectiveness of flux coupling throughout the magnetic circuit. Higher magnetic circuit permeances and correspondingly steeper sloping load lines are desirable in that they are instrumental in optimizing the signal strength generated by the sensor as described below with reference to FIG. 4.

Line pairs A—A' and B—B' represent, respectively, load lines for first and second orientations of sensor assembly components within the ambit of the present invention. Lines A and A' represent, respectively, on tooth and off tooth positions for a sensor according to the invention having coil 40 positioned radially adjacent inner circumference 21 of outer race 6, and pole piece 45 or magnets 41 positioned axially adjacent thereto and substantially outside annular space 10. Lines B and B' represent, respectively, on tooth and off tooth positions for a sensor according to the invention having pole piece 45 or magnets 41 positioned radially adjacent inner circumference 21 of outer race 6, and coil 40 positioned axially adjacent thereto and substantially outside annular space 10. A sensor component configuration corresponding to load lines B—B' and the immediately preceding description is illustrated in FIG. 1.

Figure 5:
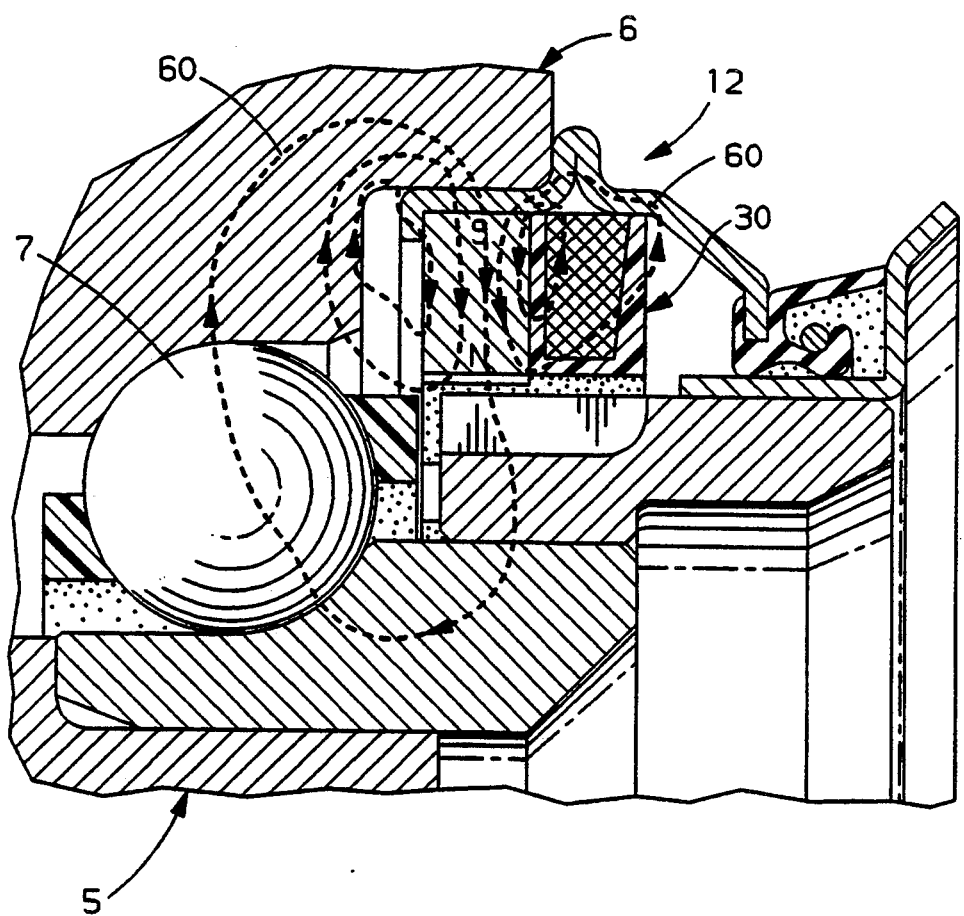
FIG. 5 shows flux paths of a first embodiment of an integral rotation sensor and bearing grease seal according to the invention as illustrated in FIG. 1.

Output of a variable reluctance sensor is commensurate with the magnitude of flux change through the magnetic circuit. Optimizing the magnetic circuit permeability, by minimizing air gaps and leakage flux and by maximizing high permeance flux paths, shifts the load lines to a steeper slope. This raises their intersection points with demagnetization curve 50 and further separates the on and off tooth operating points along demagnetization curve 50 as graphically illustrated in FIG. 4. As between the two pairs of load lines, pair B—B' represents the sensor embodiment which exhibits a greater flux difference ($\Delta B_2$) due to overall greater magnetic permeance of the magnetic circuit corresponding to on and off tooth positions. By arranging pole piece or magnets radially adjacent inner circumference 21 of outer race 6 and choosing high permeance materials, overall permeance of the magnetic circuit is increased through purposeful exploitation of outer race 6 and housing 13 (including flange 16) as high permeance magnetic circuit elements. Flux paths 60 through these portions are illustrated in FIG. 5. All other things being equal, this results in steeper sloping load lines, higher on and off tooth operating points and larger flux difference between on and off tooth operating points. This provides a greater flux change as the toothed ring alternately introduces teeth and air gaps into the magnetic circuit. The periodic signal generated by the flux change will have a correspondingly greater peak to peak range. The greater the flux change, the greater the corresponding peak to peak range of the periodic signal. This translates into stronger, more easily and accurately detectable signals at low rotational speeds as well as an increased signal to noise ratio.

The embodiments of the invention in which an exclusive property or privilege is claimed are defined as follows:

1. In a bearing assembly having a stationary outer race and a coaxial rotating inner race, the inner race having annexed thereto a toothed ring with circumferentially symmetrical alternating high and low magnetically permeable regions, an integral rotation sensor and bearing grease seal comprising, in combination:
   a high magnetic permeability housing having a substantially cylindrical outer surface sized for compressive mounting against the outer race, an inner surface radially opposite thereto and an inner race sealing lip;
   a high magnetic permeability ring-shaped flux member concentric within said housing and having an outer circumference and an inner circumference, said outer circumference sized for contiguous communication with said inner surface of said housing;
   a plurality of permanent magnets each having a pair of poles, a similar one of said poles of each magnet being contiguous with said inner circumference of said flux member such that said poles of each magnet are aligned radially, each of said permanent magnets being circumferentially spaced from the others by whole number multiples of an arc equal to the arc between two adjacent high magnetically permeable regions of the toothed ring;
   a wire coil concentric within said housing and adjacent said flux member and said permanent magnets, said wire coil having a pair of terminal ends to provide a sensor output; and
   a seal statically secured to said inner race sealing lip and dynamically communicating with said inner race.

2. An integral rotation sensor and bearing grease seal of claim 1 wherein said housing further comprises an annular flange depending radially outward from said substantially cylindrical outer surface.

3. In a bearing assembly having a stationary outer race and a coaxial rotating inner race, the inner race having annexed thereto a toothed ring with circumferentially alternating high and low magnetically permeable regions, an integral rotation sensor and bearing grease seal comprising, in combination:
   a housing;
   a permanent magnet having a pair of radially aligned poles;
   uninterrupted high magnetic permeability flux coupling means radially contiguous at an outer surface thereof with said outer race and radially contiguous at an inner surface thereof with one of said permanent magnet poles;
   a wire coil axially adjacent said permanent magnet, said wire coil having a pair of terminal ends to provide a sensor output;
   a static seal between said housing and outer race; and
   a dynamic seal between said housing and inner race.

4. In a bearing assembly having a stationary outer race and a coaxial rotating inner race, the inner race having annexed thereto a toothed ring with circumferentially alternating high and low magnetically permeable regions, an integral rotation sensor and bearing grease seal comprising, in combination:
   a housing;
   a plurality of permanent magnets each having a pair of poles, each of said magnets being angularly spaced from the others by whole number multiples of an arc equal to the arc between two adjacent high magnetically permeable regions of the toothed ring, said pair of poles of each magnet further being aligned radially such that similar poles of each magnet are circumferentially aligned with one another;
   uninterrupted high magnetic permeability flux coupling means radially contiguous at an outer surface thereof with said outer race and radially contiguous at an inner surface thereof with the circumferentially aligned similar poles of each of said magnets;
   a wire coil axially adjacent said permanent magnets, said wire coil having a pair of terminal ends to provide a sensor output;
   a static seal between said housing and outer race; and
   a dynamic seal between said housing and inner race.

5. An integral rotation sensor and bearing grease seal of claim 4 wherein said flux coupling means comprises said housing.

* * * * *